No. 661,673. Patented Nov. 13, 1900.
G. H. F. SCHRADER.
TIRE AND VALVE ATTACHER AND VALVE THEREFOR.
(Application filed Apr. 15, 1899.)
(No Model.)
FIG. 1.
FIG. 2.
FIG. 3.
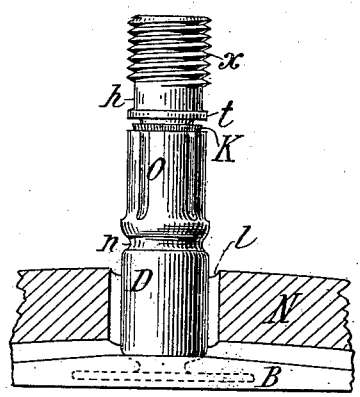
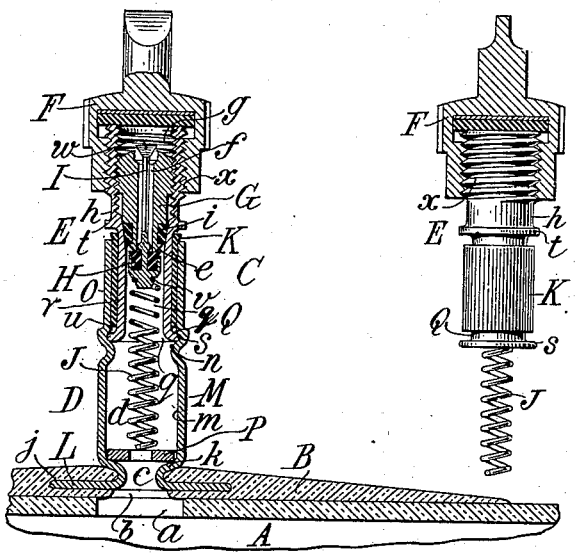
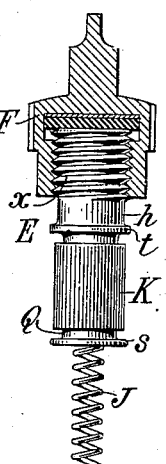
FIG. 5.
FIG. 4.
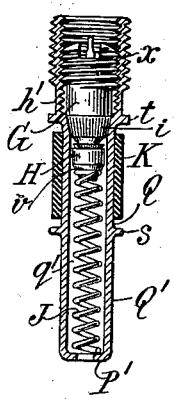
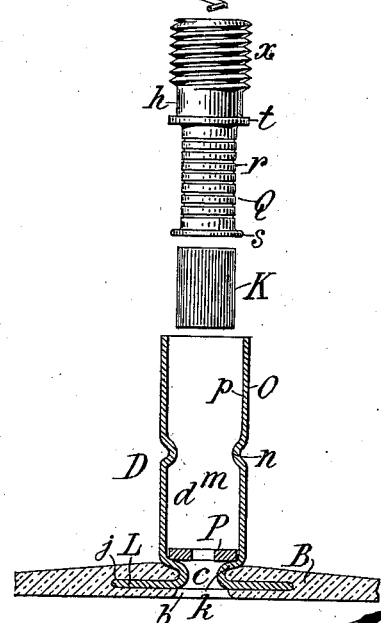
WITNESSES:
Fred White
Thomas F. Wallace
INVENTOR:
George H. F. Schrader,
By his Attorneys.

UNITED STATES PATENT OFFICE.

GEORGE H. F. SCHRADER, OF NEW YORK, N. Y.

TIRE AND VALVE-ATTACHER AND VALVE THEREFOR.

SPECIFICATION forming part of Letters Patent No. 661,673, dated November 13, 1900.

Application filed April 15, 1899. Serial No. 713,098. (No model.)

*To all whom it may concern:*

Be it known that I, GEORGE H. F. SCHRADER, a citizen of the United States, residing in the city, county, and State of New York, have invented certain new and useful Improvements in Tires and Valve-Attachers and Valves Therefor, of which the following is a specification.

This invention relates to pneumatic tires and their valves, and aims to provide improved means for attaching a valve to a tire and an improved tire-valve.

In attaching cot-valves to tires either an integral cot or one having a wide base cemented to the tire has been used, the tubular cot being of rubber, so that it can be compressed against the valve-shell by binding wire around the cot when its shell is fastened in place. The rubber cot has been fragile, easily destroyed by creeping of the tire in the felly, and time has impaired the life or imperviousness of the rubber. For shoe-valves an attaching-disk has been cemented to the tire, which either alone or together with the tire has been clamped between the shoe and nut of the valve-shell. The shoe-valve is a desirable construction in that it provides a metal body from the face of the tire inwardly; but it is comparatively expensive and difficult of manufacture, usually requiring that the shell be turned out of metal of a larger diameter than the diameter of the shoe or flange, which means that except at the flange a great deal of cutting must be done to reduce the body to the diminutive proportions desirable for entering the valve-hole through the felly. For both these classes of valves it has not been feasible to join the valve-shell and tire during the process of making the tire, so that the two could be secured together for making a leak-tight permanent joint between them. The delicate construction of the interior of the valve has made it impracticable to so attach an assembled valve, and the danger of impairment or fouling of the interior of the valve-shell, together with the risk of loss of some of the working parts when separated from the shell, has made it inadvisable to attempt to unite the shell and tire by securing them together. With both characters of valve a mechanical coupling has been found more convenient and economical than any known means by which the valve-shell and tire could be vulcanized together.

My present invention aims to provide an improved construction of tires and tire-valve attacher and an improved tire-valve especially adapted to enable the connection of the valve to the tire by vulcanizing and to decrease the expense of connection, increase the wearing power of the parts, and provide a simple construction of valve.

To this end in carrying out the preferred form of my present invention I provide a metallic cot-tube for a pneumatic tire, adapted to be cemented or otherwise suitably attached to the tire, as by being secured into an attaching-disk, which is cemented to the tire at one end and adapted at its other end to receive a valve-shell, being of soft material and suitable formation to permit its clamping or crimping tightly against the shell, and I construct the valve-shell and metallic cot with reciprocal provisions for their connection together, and I provide a packing-ring between them, and I provide a valve-shell constituting part only of the valve chamber and a cot constituting the balance of such chamber, and I provide a valve in which the parts are united for bodily connection to the cot, so that no disassembling of the parts of the valve will be necessary to unite it to the tire, and I provide certain other features of improvement, all of which will be fully pointed out in the claims.

In the accompanying drawings, Figure 1 is a side elevation of my improved tire-valve attacher and valve. Fig. 2 is an axial section thereof. Fig. 3 is a side elevation of the valve member detached. Fig. 4 is a fragmentary elevation and axial section showing the different parts of the valve and attacher, and Fig. 5 is an axial section showing a modification.

Referring to the drawings, let A designate a pneumatic tire; B, a rubber attacher; C, my improved valve as a whole; D, the cot member thereof; E, the valve member thereof; F, the cap; G, the seat member of the valve; H, the valve proper; I, its stem, and J its spring.

The tire A and attaching-disk B are of rubber or other flexible material and are cemented together in such position that the aperture $b$ through the attacher shall coincide with the aperture $a$ in the tire, so that these may constitute part of the egress-duct $c$ of the valve C. The valve has a valve-chamber $d$, seat $e$, and an ingress-duct $f$. The seat $e$ is carried by the member G, which is removably coupled in the socket $g$ of the shell $h$. A leak-tight joint between the member and shell is formed by a packing $i$, compressed between the two.

According to one feature of improvement I provide a metal cot D, which is a tube of relatively soft metal adapted for attachment to the tire or attacher at one end and to the valve at the other end and preferably secured to the attacher by means of its shoe-flange L, which is enveloped in a socket $j$ in the attacher and vulcanized or cemented therein with an air-tight joint. Between the flange L and the body M of the tube D the latter is formed with an annular neck or external groove $k$, in which the lower end of the attacher fits. Beyond this neck the body M rises as a cylindrical body externally suited for contact with the walls of a valve-socket $l$ in the felly N and internally having a chamber $m$, constituting part of the valve-chamber $d$. Above the body M the tube D has a contraction or internal shoulder $n$, beyond which it has an enlargement O, having an internal socket $p$ open at its outer end and adapted to receive the lower end of the valve member E. The end O is adapted to be compressed against the valve member for uniting these parts together. The tube D and attacher B may be originally secured together and sold as a new article of manufacture for use as a tire-valve attacher, the tube being suited to receive any tire-valve and the attacher being suited to be cemented to the face of any suitable tire. The tube constitutes a metallic cot capable of resisting wear and impervious to the destructive effects of time and moisture, which contribute so rapidly to the impairment of rubber cots. It can be easily compressed around the valve-shell by any pinching-tool, can be easily expanded to release the shell, and again compressed to connect another shell, and, if desired, it may constitute part of the valve-chamber, as shown, in which case if a spring-valve is used a spring-holder or cross-piece P may be dropped into the bottom of the tube, or if the tube has a neck $k$ this neck may be made so small as to prevent the spring from slipping inwardly. The tube may be of any suitable form and construction, and the tube and attacher may be united together in any desired manner.

According to another feature of my invention I provide an improved valve member E, this consisting of a valve-shell, valve-seat, and valve proper connected together, the shell having an inner end Q, adapted to be passed within and clamped to a tubular cot, as the tube D, and having an internal socket $q$ open at its end and constituting part of the valve-chamber $d$ of a valve. The end Q of the shell $h$ has preferably a reduced cylindrical portion $r$ between an end flange $s$ and a body-flange $t$. The portion $r$ may have a plurality of circumferential grooves surrounding it. It is of less diameter than the socket $p$ in the tube D, and it and the flange $s$ are adapted to pass within this tube, and the flange is preferably adapted to seat on the shoulder $n$ thereof. The flange $t$ is of sufficient projection to strike the end of the tube should the shoulder $n$ fail to arrest the inward movement of the valve member. A ring K, of packing material, is placed on the end Q, pure rubber elastically embracing this end being preferably employed. This ring is compressed between the tube D and the end Q when the tube is contracted around the end, and this insures a leak-tight joint between the tube and valve member. The tube is compressed inwardly at one or more points until the inner shoulders $u$ are formed on the walls of the tube above the flange $s$, so that the flange is locked between the shoulders $n$ and $u$.

The shell E is preferably tubular, its chamber $q$ being its part of minimum internal diameter, from which it flares outwardly into the socket $g$, open at its outer end. The plug G is removably coupled within its socket, so that the seat $e$ projects into the socket $q$. The valve proper, H, is held within the socket $q$ by the stem I and is free to work within the shell while being protected by the walls of the open end Q thereof. The spring J when used may project partly within the shell $h$ and partly within the tube D. I prefer to connect the spring and the valve proper together in some suitable manner, as by twisting the end of the spring into a groove $v$ on the valve proper, so that these parts cannot be separated and one accidentally lost. I also prefer to irremovably couple the valve proper to the seat member in some suitable way, as by forming a head $w$ on the end of the valve-stem I. Externally the shell has the usual screw-thread $x$, over which the cap F screws. The valve member as a whole, consisting of the shell $h$, seat member, and valve proper, and preferably also of the cap and spring, is sold as an article of manufacture, consisting of a shell having an open valve-chamber adapted for insertion in and attachment to a tube, which shell constitutes both a holder for the valve and a valve-chamber auxiliary to that of the valve member. The valve member has no disconnected parts, consists of one structure when assembled, and it can be sold and manipulated in this form for attachment to any tire-cot, or it and my improved cot member can be attached together before sale, and the combined article can be sold as a tire-valve and attacher, which can be applied to any tire by any ordinary person without requiring the use of special tools. The most advantageous use, however, will be that in which the cot-tube is by itself connected or attached to the tire or to the tire-valve attacher during the manufacture of these parts or either of them, so that the tube can be secured to the part to which it is attached while the latter is being vulcanized. The tube being a plain metal tube cannot be injured during this process, and its attachment will be greatly improved both as to strength and imperviousness by reason of the vulcanizing of the rubber to the tube. When the tires or attachers are thus formed with the tubes, the valve members as a whole can be slipped into the tubes and be clamped therein without difficulty and without danger of injury. In this way a cheap, strong, and durable joint can be obtained between the tire-valve and the tire. When so assembled, the cot-tube D and shell $h$ constitute, essentially, a two-piece valve-shell having between their telescoping ends a packing material. With the construction of valve shown the entire internal parts of the valve can be removed by unscrewing the member G without disturbing the joint or connection between the tube and shell.

It will be seen that my invention provides improvements which can be readily and advantageously availed of, and it will be understood that the invention is not limited to the particular details of construction and arrangement and combination of the parts set forth as constituting this preferred form, since it can be employed in whole or in part according to such arrangements, combination of parts, or details of construction as circumstances or the judgment of those skilled in the art may dictate without departing from the spirit of my invention.

One modification is shown in Fig. 5, in which the shell member $h$, instead of terminating with an open socket, has a closed socket $q'$, closed at its end by an inturned flange $P'$, which holds the spring J in place, the end Q of the shell being continued as an end $Q'$ below the flange $s$. In other respects this construction is the same as that before described, and in use it will be placed within and connected to the tube D in the manner described, the end $Q'$ of the shell passing the shoulder $n$ of the tube, so that the flange $s$ may rest on this shoulder.

What I claim is—

1. The improved cot for tire-valves consisting of a metal tube adapted to be attached to a pneumatic tire at one end and having a compressed open end portion at its other end, an open socket for receiving a valve member, and an internal shoulder for limiting the movements of such member, whereby a tire-valve can be connected to said cot by being clamped within the open end thereof, and said cot will present a metallic exterior to the felly of a wheel to prevent creeping of the tire.

2. The improved cot for tire-valves consisting of a metal tube having means at one end for connecting it to a tire, having a compressed outer end, a socket inwardly of said end for receiving a tire-valve, and an internal shoulder for holding such valve.

3. The improved cot for tire-valves consisting of a tube D having a flange L at one end, a socket $p$ at its other end having longitudinal projecting faces, and a compressed portion at said socket end, and formed of compressible metal, substantially as and for the purposes set forth.

4. The improved cot for tire-valves consisting of a tube adapted to be connected to a tire-valve at one end, having an open-ended socket at its outer end and having an internal chamber $d$ adapted to constitute part of the valve-chamber of a tire-valve, an internal shoulder $u$ and a compressed end beyond said shoulder at its outer end.

5. The improved tire-valve attacher consisting of a flexible disk B adapted to be cemented to a pneumatic tire and a metal tube D connected to said disk at one end, having a socket for receiving a tire-valve at its other end, and having compressed walls at its socket end, and an internal shoulder $u$ at the inner end of said compressed wall for limiting the outward movement of a valve-shell.

6. The improved attacher for tire-valves consisting of a flexible disk B, and a metal tube D such tube having a flange engaging said disk, a neck $k$ embraced by said disk and a soft-metal socket end.

7. The improved attacher for tire-valves consisting of a flexible disk B having a socket $j$, a metal tube D having a flange L secured in said socket and having a soft-metal outer end having a socket adapted to receive a tire-valve and an internal shoulder for limiting the movement of such valve.

8. In pneumatic tires, a tire A, an attacher B cemented thereto, and a metal tube connected to said attacher, and having a soft-metal end and a socket therein for receiving a tire-valve and a shoulder for limiting the movement of such valve.

9. The improved valve member consisting of a valve-shell, having a valve-seat and valve-chamber, an external wall $r$ surrounding said chamber and adapted to pass within and be engaged by a tire-cot, a valve proper in said chamber, and a packing material surrounding said wall for passing within and making direct leak-tight contact with said cot.

10. The improved valve member consisting of a shell $h$ having a wall $r$ and a flange $s$ for passing a tire-cot, a packing material surrounding said wall above said flange, a valve-seat on said shell, and a valve proper engaging said seat.

11. The improved valve member consisting of a shell $h$, having an external wall $r$ for engagement with a tire-tube, shoulders $s$ and $t$ at the extremities of said wall, an open-ended valve-chamber within said shell, a valve-seat carried by said shell, a valve proper engaging said seat in said chamber and a spring connected to said valve proper and projecting through the open end of said chamber.

12. The improved tire-valve consisting of a shell *h* having an open-ended chamber, a metal tire-tube D having a compressible end and a socket-opening through said end, said chamber and socket constituting the valve-chamber of the valve, and said shell held in said tube by compression of the cot about the shell, and a packing between said cot and shell.

13. The combination with a valve-shell, of a metallic cot adapted to be attached to a tire, said cot having its end compressed on said valve-shell, holding the latter in place therein.

14. The combination with a valve-shell, of a metallic cot adapted to be attached to a tire, said valve-shell extending within said cot and held in place by compression of the cot about the shell, and a packing material between said cot and shell.

15. The combination with a valve-shell of a metallic cot having a projection for limiting the inward movement of the shell, and compressed about the latter above such projection.

16. The combination with a valve-shell having a flange at its inner end, of a cot having a projection engaging said flange, said shell held in said cot by compression of the latter about the shell above the engaging-point of said projection and flange, and a packing material between said cot and shell.

17. The improved cot for tire-valves consisting of a metal tube adapted to be attached to a pneumatic tire at one end, and having a soft-metal socket end adapted to be compressed about a valve-shell, and an internal shoulder for abutting against such shell.

18. The improved cot for tire-valves consisting of a tube adapted to be attached to a pneumatic tire at one end, and having a socket end, and inwardly-extending corrugations at such socket end.

19. The improved cot for tire-valves consisting of a tube adapted to be attached to a pneumatic tire at one end, and having a socket end and longitudinal inwardly-extending portions between its ends.

20. The improved cot for tire-valves consisting of a tube adapted to be attached to a pneumatic tire at one end, and having a socket at its other end, and a crimped portion at its socket end.

In witness whereof I have hereunto signed my name in the presence of two subscribing witnesses.

GEORGE H. F. SCHRADER.

Witnesses:
GEORGE H. FRASER,
THOMAS F. WALLACE.